(12) United States Patent
Nieminen et al.

(10) Patent No.: US 8,167,117 B2
(45) Date of Patent: May 1, 2012

(54) METHOD AND APPARATUS FOR HANDLING ROLLS

(75) Inventors: Esko Nieminen, Hyvinkää (FI);
Markku Santala, Järvelä (FI)

(73) Assignee: Metso Paper, Inc., Helsinki (FI)

( * ) Notice: Subject to any disclaimer, the term of this patent is extended or adjusted under 35 U.S.C. 154(b) by 279 days.

(21) Appl. No.: 12/593,200

(22) PCT Filed: Mar. 28, 2008

(86) PCT No.: PCT/FI2008/050151
§ 371 (c)(1),
(2), (4) Date: Oct. 15, 2009

(87) PCT Pub. No.: WO2008/119885

PCT Pub. Date: Oct. 9, 2008

(65) Prior Publication Data
US 2010/0126825 A1    May 27, 2010

(30) Foreign Application Priority Data

Mar. 30, 2007   (FI) ...................................... 20075218

(51) Int. Cl.
*B65G 25/00*    (2006.01)
(52) U.S. Cl. ...................... 198/777; 198/530; 414/746.4
(58) Field of Classification Search ................ 198/530, 198/531, 777, 775, 774.1; 414/746.4, 911
See application file for complete search history.

(56) References Cited

U.S. PATENT DOCUMENTS

| | | | | | |
|---|---|---|---|---|---|
| 3,584,726 | A | * | 6/1971 | Hartzell | 198/530 |
| 3,999,684 | A | * | 12/1976 | Ekholm | 198/530 |
| 4,212,584 | A | * | 7/1980 | Johnson | 414/746.4 |
| 4,361,223 | A | * | 11/1982 | Johnson | 414/746.4 |
| 4,911,283 | A | * | 3/1990 | Hollins | 414/746.4 |
| 6,336,547 | B1 | * | 1/2002 | Redekop | 198/777 |
| 2003/0133781 | A1 | | 7/2003 | Lehrieder et al. | |

FOREIGN PATENT DOCUMENTS

| | | |
|---|---|---|
| GB | 1094805 A | 12/1967 |
| JP | 6126330 A | 5/1994 |
| WO | 2008119885 A1 | 9/2008 |

OTHER PUBLICATIONS

Written Opinion of the International Searching Authority issued in PCT/F12008/050151.
Search Report issued in PCT/F12008/050151.

* cited by examiner

*Primary Examiner* — James R Bidwell
(74) *Attorney, Agent, or Firm* — Stiennon & Stiennon (57) ABSTRACT

A sorting deck for paper, board, or pulp rolls has a plane (1) for transporting the rolls and controllable stops (2) for holding the rolls in place and releasing them. The stops (2) are positioned to form at least one line (3) in placed consecutively in the longitudinal direction (4) of the plane (1), and at least one row (5), in which the stops (2) are positioned adjacently to each other along the lateral direction (6) of the plane (1). At least some of the stops (2) are a collector (41) and a feeder (42), both of which can be moved freely between the hold and release positions, so that the travel of the rolls over the stop (2) can be optionally prevented, freely permitted, or permitted one roll at a time. The same sorting deck can be used to handle rolls of different widths.

22 Claims, 8 Drawing Sheets

Fig. 8

METHOD AND APPARATUS FOR HANDLING ROLLS

CROSS REFERENCES TO RELATED APPLICATIONS

This application is a U.S. national stage application of International App. No PCT/FI2008/050151, filed Mar. 28, 2008, the disclosure of which is incorporated by reference herein, and claims priority on Finnish App. No. 20075218 filed Mar. 30, 2007.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a sorting deck, for paper and board rolls. The invention also relates to a method, for handling paper, board, or pulp rolls, with the aid of a sorting deck.

Sorting decks are typically used in a paper-roll store for sorting paper and board rolls of different widths into queues according to width, diameter, or order batch. Sorting is usually carried out to facilitate the further processing of rolls by order batch. Each sorting deck is designed to receive rolls up to a maximum width and these sorting decks of different width are then placed next to each other. This creates a kind of roll matrix, which comprises several adjacent ramps, with rolls of approximately the same width being always stored on each ramp. The movement of the rolls along the ramp is controlled with the aid of stops located on the ramp.

A set of ramps formed of several ramps naturally takes up quite a lot of space, which at times may not be fully used. Underutilization of the reserved space occurs particularly if rolls of only a certain width are manufactured. When wide rolls are being manufactured, the ramps for narrow rolls will be empty. When narrow rolls are being manufactured, there will be much empty space on the ramps, at the same time as there will be a lack of ramps.

The invention is intended to create a technical solution, by means of which a more efficient use of space will be possible in sorting decks and/or in totalities formed from them.

SUMMARY OF THE INVENTION

The invention is based on equipping at least some of the stops of the sorting deck with separate collectors and feeders, which are located at a distance from each other in the longitudinal direction of the plane of the sorting deck and which can both be freely moved between the hold and release positions. Thus the movement of rolls over a stop can be optionally prevented, freely permitted, or permitted only one roll at a time.

The method according to the invention is characterized by at least each stop of the row of stops comprising a collector and a feeder, which are located at a distance from each other in the longitudinal direction of the plane, and both of which can be moved freely between the hold and release positions, so that the travel of the rolls over the stop can be optionally prevented, freely permitted, or permitted one roll at a time.

Considerable advantages are gained with the aid of the invention, as the invention permits a more efficient use of space when using sorting decks and totalities formed from them. By using a single sorting deck, rolls of several widths can be handled, so that specific ramps for different roll widths may not be needed. In that case, the total surface area of the set of sorting decks can be reduced, as ramps need not be kept empty, even when rolls of only a single width are manufactured for a longer period of time.

This is based on the stops being independently moveable between the hold and release positions. With the aid of independently controllable stops, freely selectable routes for the rolls are formed on the plane of the sorting deck. The freely selectable routes can thus be altered as required and there will no longer be a need to reserve fixed routes on the sorting deck for rolls of different sizes. This also means that, by suitably setting the stops, wide rolls can travel over several adjacent stops while several narrow rolls alongside each other can be guided to the same ramp and guided with the aid of these adjacent stops.

In the following, the invention is examined with the aid of examples and with reference to the accompanying drawings.

DESCRIPTION OF THE PREFERRED EMBODIMENTS

Figure 1:
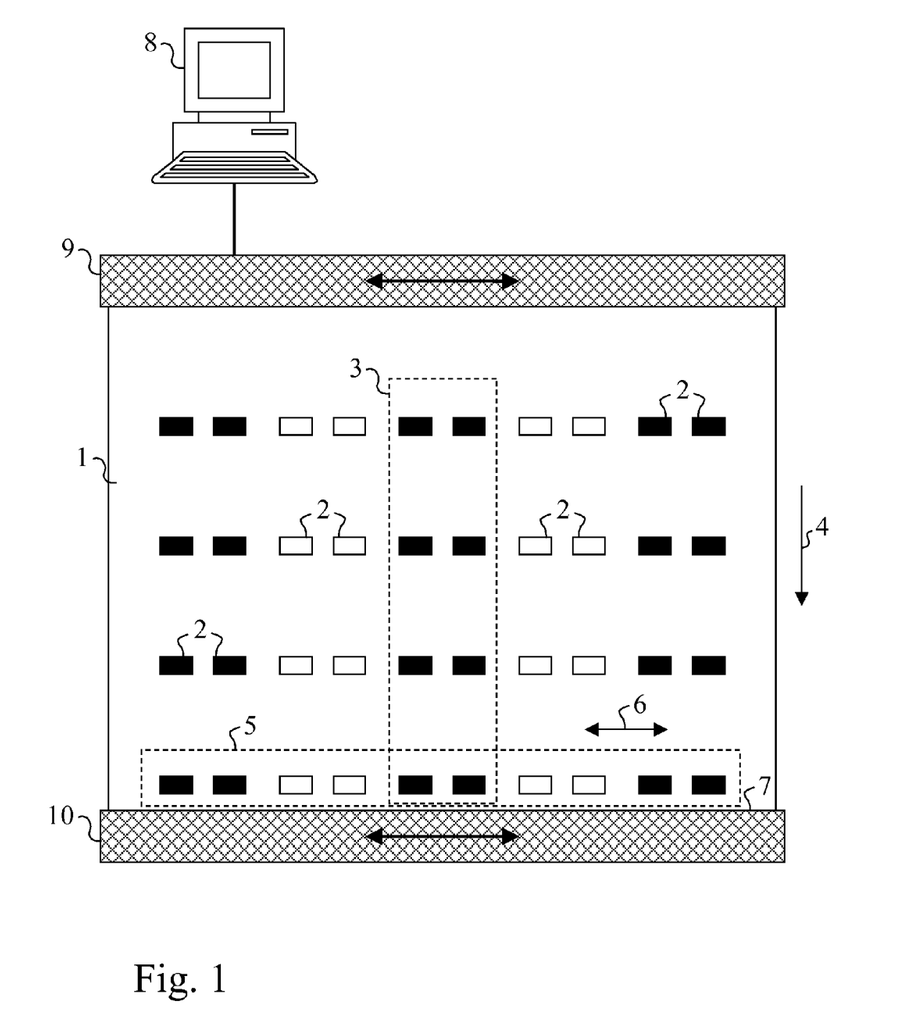
FIG. 1 shows a top view of a sorting deck according to one embodiment.

FIG. 1 shows a sorting deck for paper and board rolls, according to one embodiment. The same sorting deck is also shown in different operating situations in FIGS. 2 and 3. The sorting deck of the figures is connected between conveyors 9 and 10, in such a way that, with the aid of the conveyor 9, rolls for sorting can be brought to the upper end of the sorting deck while correspondingly the sorted rolls can be guided onto the conveyor 10 at the lower end of the ramp, where there is also the lower edge 7 of the ramp. The sorting deck comprises an inclined plane 1 between the upper end and lower end, along which plane the rolls can be rolled. In addition, the sorting deck comprises controllable stops 2 for holding the rolls on the inclined plane 1 in place on the inclined plane and releasing them to roll along the inclined plane 1. As shown in FIG. 1, the stops 2 are placed to form at least one line 3 of stops, in which the stops 2 are located consecutively in the longitudinal direction 4 of the inclined plane 1. In the embodiment of FIG. 1, the stops actually form five parallel lines 3 of stops.

FIG. 1 also shows four rows 5 of stops set consecutively in the longitudinal direction 4, in which the stops 2 are positioned adjacently to each other along the transverse direction 6 of the inclined plane 1. There should be at least one such row and it would be desirable for at least one of the rows to be located close to the lower edge 7 of the sorting deck. Close to the lower edge 7 means that the shortest distance between the lower edge 7 and the stop 2 is typically in the order of magnitude of the diameter of the roll being handled, for example, 0.5-2 times the diameter of a typical roll. This distance can thus be, for example, less than 3 meters, for example, in the range 0.5-2 meters. In this way the use of space on the sorting deck is kept efficient. On the other hand, it is desirable if the distance is large enough for the conveyor 10 to be able to carry rolls, even when the stop 2 is in the hold position.

Figure 2:
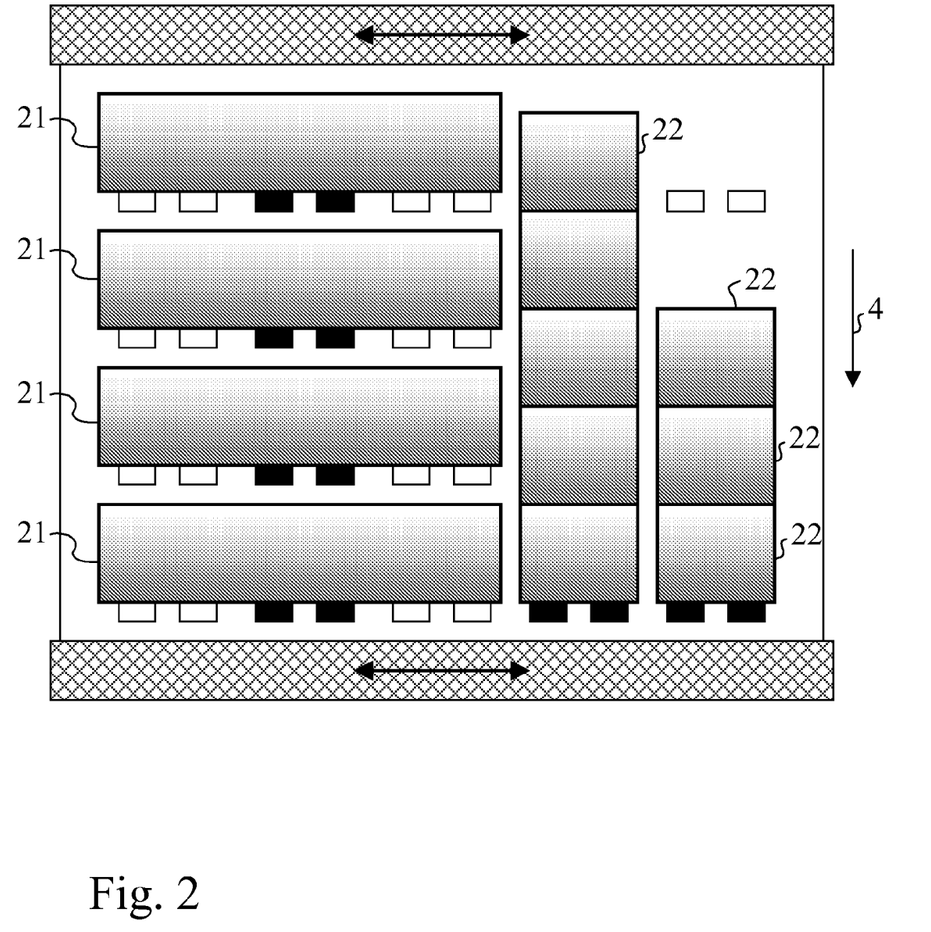
FIG. 2 shows the sorting deck of FIG. 1, in one possible operating situation.
Figure 3:
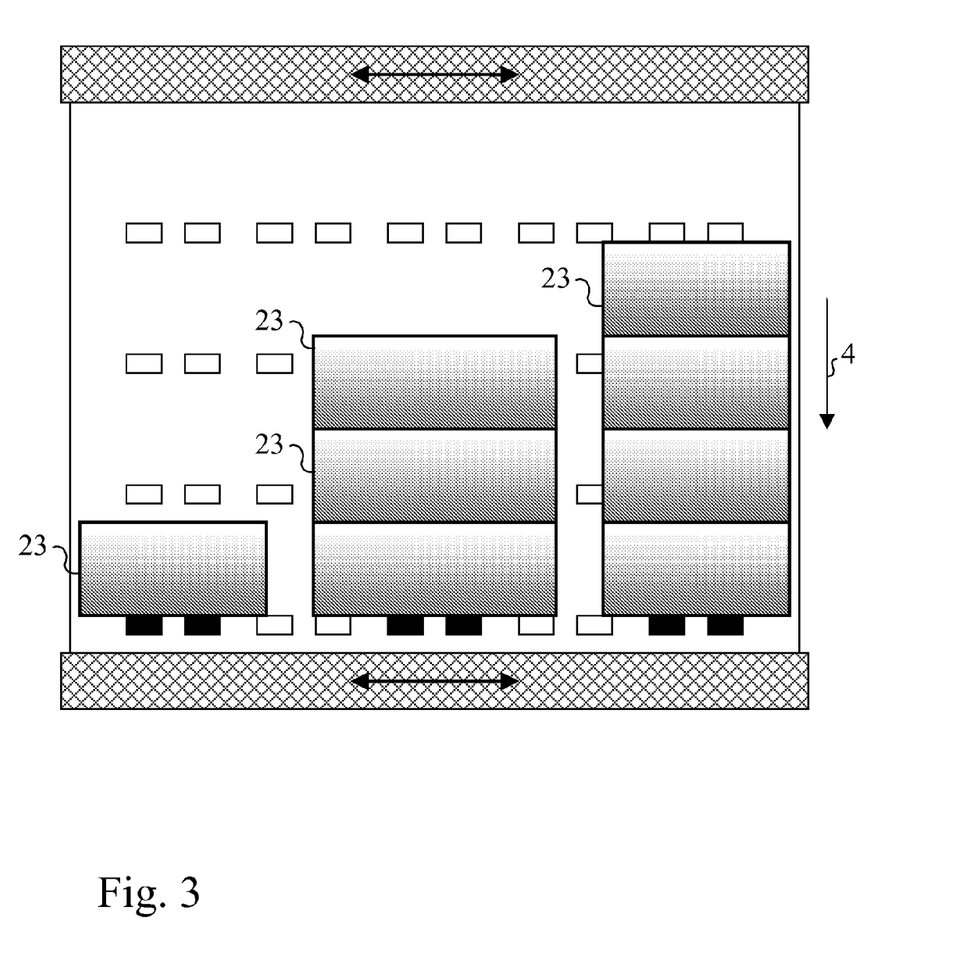
FIG. 3 shows the sorting deck of FIG. 1, in a second possible operating situation.

In the embodiment of FIG. 1, the stops 2 are arranged to be independently moveable between the hold and release positions. The stops being independently moveable means that each stop can be controlled independently of the other stops and their positions. The hold position refers to the operating element of the stop 2, arranged for the purpose, being in a position in which it prevents the roll from rolling along the plane 1 over the stop 2. The release position, for its part, means that the operating elements of the stop 2 do not prevent the roll from rolling over the stop 2. In FIGS. 1-3, the stops 2 in the hold position are shown by black rectangles depicting the stops. Correspondingly, the stops 2 in the release position are shown by white rectangles depicting the stops.

The stop itself can be any kind of stop whatever suitable for the purpose, but in the preferred embodiment at least each stop of the row of stops closest to the lower edge 7 comprises a collector and feeder, which are located at a distance from each other in the longitudinal direction 4 and both of which can be moved freely between the hold and release positions. The stop can then be used not only to prevent the rolling of the rolls and permit free rolling, but also optionally to permit only one roll at a time to cross the stop 2. One example of such a stop 2 is shown in greater detail in connection with FIGS. 4A and 4B.

In addition, FIG. 1 shows a controller device 8, with the aid of which the stops 2 are moved between the hold and release positions. The controller device 8 can be, for example, a suitably programmed computer, which is connected to the stops' 2 operating devices.

With reference to FIG. 1, it can be generally stated that the sorting deck should include at least one line 3 of stops. In the line of stops, there must be at least two stops 2, usually at least three stops. The number of stops is not otherwise limited and a suitable number can be, for example, between 2 and 10. Correspondingly, the sorting deck should comprise at least one row 5, in which there are at least two stops 2, and usually at least three stops. The number of adjacent stops is also in no way limited, a suitable number being, for example, between 3 and 15.

In the embodiment of FIG. 1, the stops 2 form a matrix, in which there are five lines and four rows. The stops can also be set in the form of a matrix, in which case some of the rows and/or lines will contain fewer stops than in the row, or correspondingly line, containing the most stops. In that case, some of the stops contained in a complete matrix will, as it were, be lacking from the sorting deck. Matrix-like positioning can also mean that the stops are located in freely selected positions over the plane, in such a way that they do not form rows or lines. In the matrix-like positioning of stops, the essential feature is thus only that the stops are located in different positions over the plane, in such a way that rolls of different widths can be guided with their aid.

Figure 5:
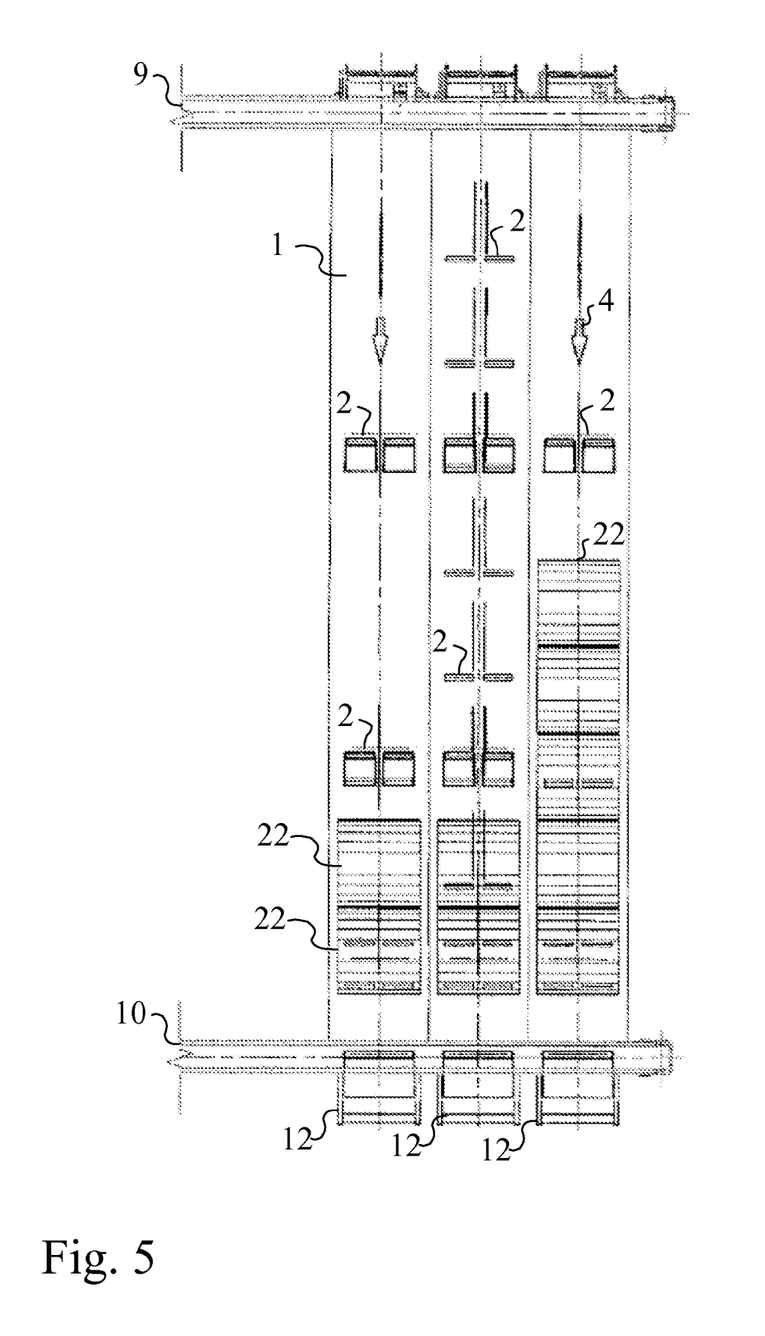
FIG. 5 shows a top view of the sorting deck of FIG. 4A, in one possible operating situation.
Figure 6:
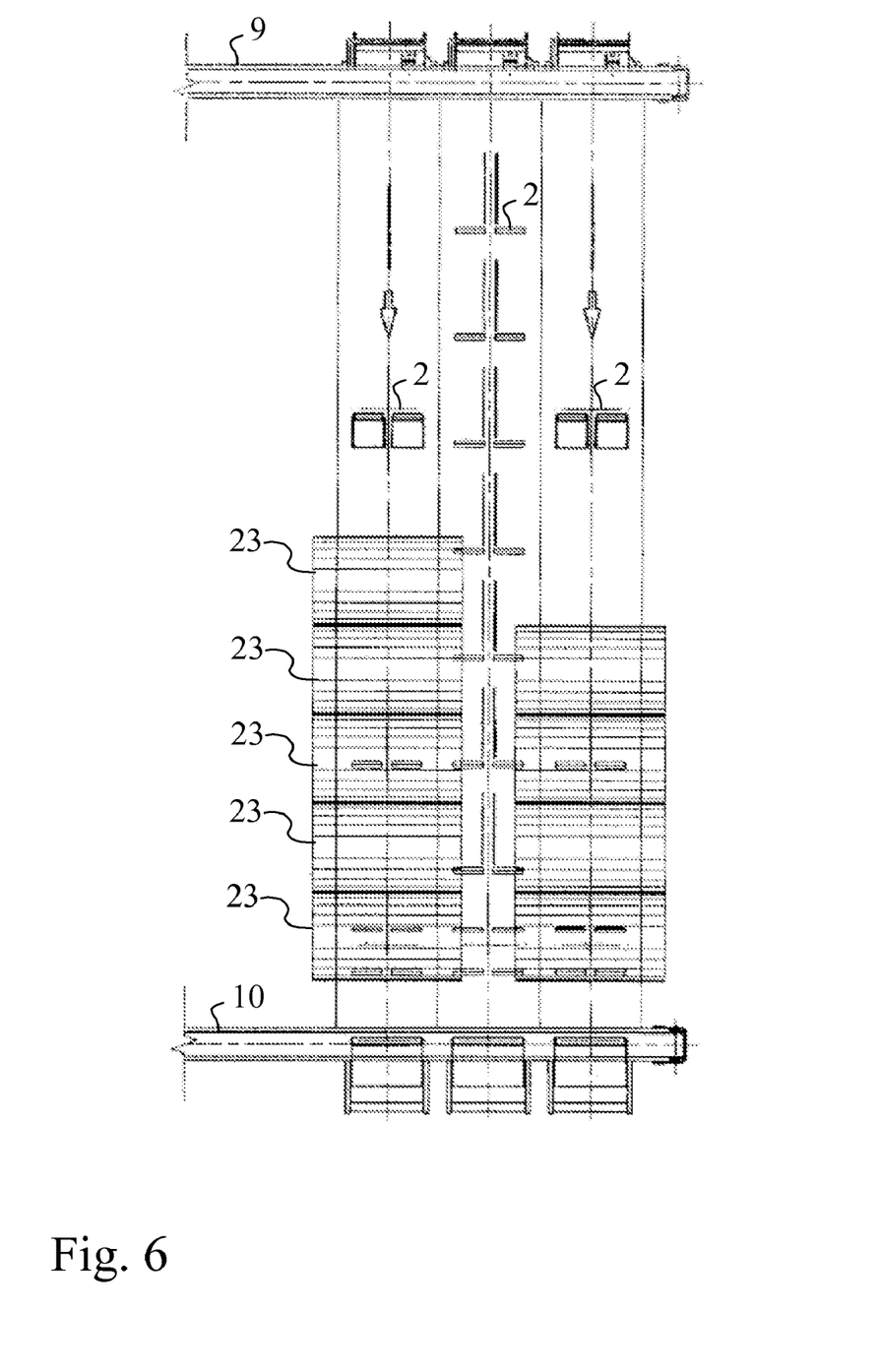
FIG. 6 shows a top view of the sorting deck of FIG. 4A, in a second possible operating situation.
Figure 7:
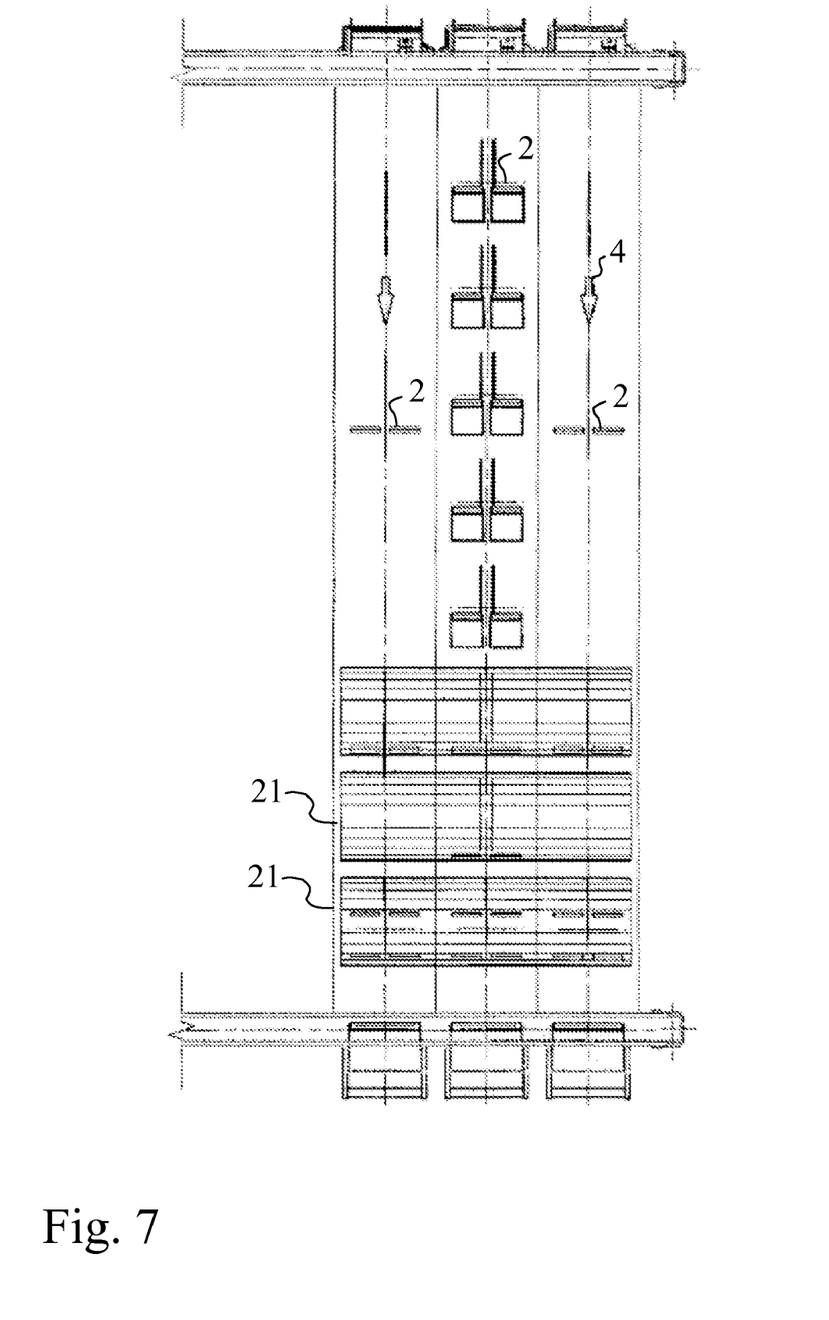
FIG. 7 shows a top view of the sorting deck of FIG. 4A, in a third possible operating situation.

FIGS. 5-7 show one possible matrix-like sorting deck, in which the central line comprises eight stops 2 and the left-hand and right-hand lines each comprise three stops 2. In other words, the sorting deck of FIGS. 5-7 comprises three parallel lines of stops and also three rows of stops and, in addition, five stops in the central line, which do not belong to any row of stops.

In the operating situation shown in FIG. 2, four wide rolls 21 have been received at one edge of the sorting deck. For this purpose, the stops of the first and third lines from the left have been moved entirely to the release position, so that the ends of the wide rolls can freely roll over them. On the other hand, the stops of the second line from the left are used to hold the wide rolls 21, so that each roll is held by its own stop. The use of its own stop for each roll is based on the assumption that wide rolls are typically so heavy that it is best not to lower them against each other on the sorting deck. The wide rolls can be guided as required one at a time to the lower-edge conveyor 10, and after this the upper rolls released one at a time to roll down onto the next stop.

Figure 4A:
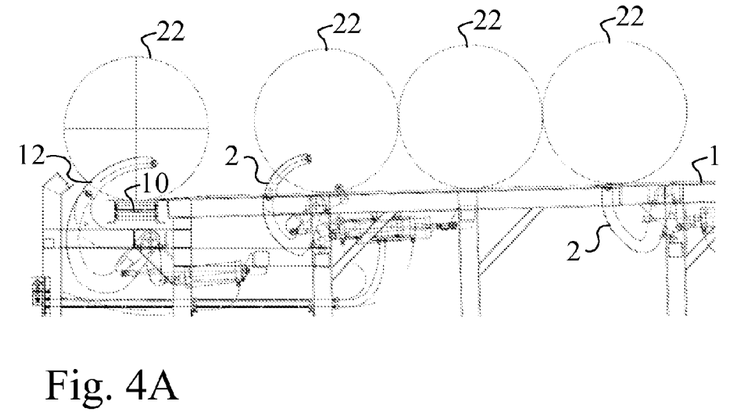
FIG. 4A shows a cross-sectional side view of the lower end of a sorting deck according to a second embodiment.
Figure 4B:
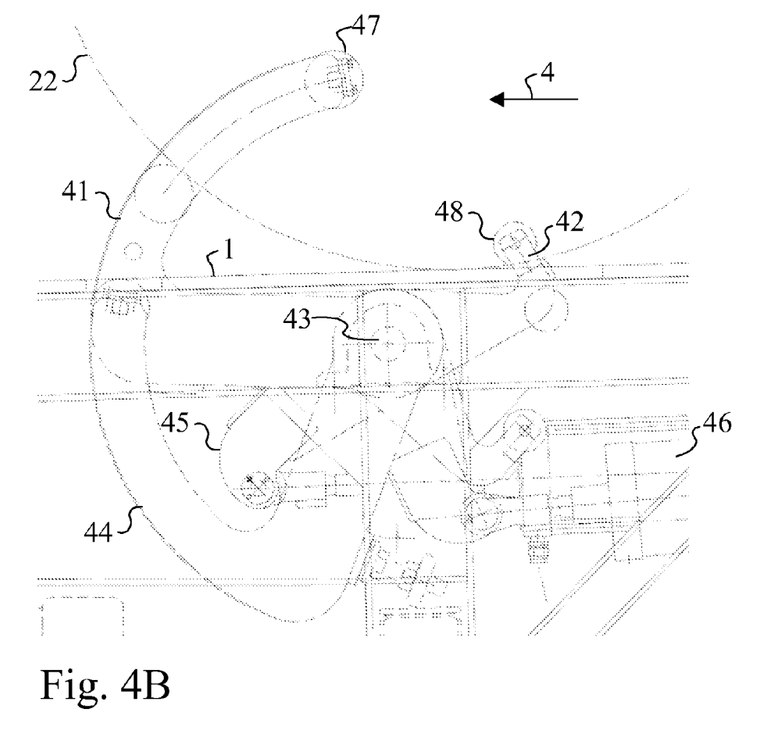
FIG. 4B shows an enlargement of the stop shown in FIG. 4A.

In the operating situation shown in FIG. 2, narrow rolls 22 have been received in the fourth and fifth lines from the left of the sorting deck. The narrow rolls of the example are so light that they can be allowed to be supported on each other on the sorting deck. This saves space, as more rolls will fit into the line in this way. For this purpose, only the lowest stops of the lines are moved to the hold position, the other stops being entirely in the release position. The narrow rolls 22 can now be guided as required to the lower-edge conveyor 10 one at a time, in which case the next roll in the line will always descend onto the stop. For operation of this kind, however, there must be a function in the stop, which permits one roll at a time to be released. Feeding operation of this kind is described above and one example of such a stop is described in greater detail in connection with FIG. 4.

In the operating situation shown in FIG. 3, rolls 23 of medium width are being handled, which are wider than the lateral intervals of the stops, but not, however, so heavy that they would require to be held individually, each on its own stop. In the operating situation of the figure, the third and fourth lines of stops from the left are moved entirely to the release position and the movement of the medium-width rolls from the sorting deck onto the conveyor 10 is controlled with the aid of the first, third, and fifth stops from the left of the lower stop row, in a manner corresponding to that described above in connection with the handling of the narrow rolls.

FIG. 4A shows a cross-sectional side view of the lower end of a sorting deck according to a second embodiment. The sorting deck according to this embodiment too comprises an inclined plane 1 and controllable stops 2 for holding the rolls in place and releasing them to roll along the plane 1. The rolls of the figure are narrow rolls 22. The figure also shows the lower-end conveyor 10, as well as a transfer device 12 akin to stops 2 for placing the rolls onto the conveyor 10. The transfer devices 12, or some other corresponding operating elements are usually also used in the embodiment shown in FIGS. 1-3.

FIG. 4B shows the stop shown in the cross-section side view of FIG. 4A in greater detail. Similar stops can also be used in connection with the embodiment shown in FIGS. 1-3. The stop comprises a collector 41 and a feeder 42, which are set at a distance from each other in the longitudinal direction 4. In corresponding known stops, the collector 41 and the feeder 42 have been in a fixed arrangement to each other, in such a way that, when the collector 42 is moved to the release position, the feeder 42 rises to the hold position. This arrangement has been intended to ensure that only one roll can pass the stop with a single operating movement of the stop from the hold position to the release position, even though the next roll would already be resting on this roll on the sorting deck. In such a situation, the next roll remains resting on the feeder 42 that has risen to the hold position, and is not been allowed to pass the stop.

The stop of FIG. 4B differs from a known stop in that both the collector 41 and the feeder 42 can be moved freely between the hold and release positions, so that the rolling of the rolls over the stop 2 can be optionally prevented, freely permitted, or permitted one roll at a time. This permits wide rolls 21 to be guided with the aid of the stops of only one line 3, even though the rolls would travel over several adjacent stops 2. In that case, both the collector 41 and the feeder 42 in the adjacent stops are moved to their release positions. In the manner described above, when guiding wide rolls, the feeders of the stops guiding the rolls too can, if desired, be kept in the release position the whole time, as each roll 21 is held with the aid of its own stop 2.

The collector 41 and feeder 42, which can be controlled freely and independently of each other, can be implemented, for example, in the manner shown in FIG. 4B.

In the embodiment of FIG. 4B, the collector 41 is arranged to be partly rotatable around a shaft 43. The collector comprises an arm 44, which, when the collector rotates in the first direction, is arranged to rise above the plane 1 to the hold position, thus preventing the roll 22 from moving, and, when the collector is rotated in the second direction, to drop to or below the level of the plane 1, to the release position, when the roll 22 can move over the collector. To rotate the collector 41, the collector 41 comprises an operating arm 45 and a hydraulic cylinder 46 connected to it. The hydraulic cylinder 46 can also be connected directly to the arm 44, in which case a separate operating arm 45 will not be needed, but the use of an operating arm 45 allows the rotating movement of the collector 41 and the operating movement of the hydraulic cylinder 46 to be more easily adapted to each other and the positioning of the hydraulic cylinder 46 in the device to be selected more freely. In addition, the figure shows a roller 47 fitted rotatably to the end of the arm 44.

In the embodiment of FIG. 4B, the feeder 42 is implemented in the same way as the collector 41, but is located on the opposite side of the shaft 43. The feeder 42 is typically located before the collector 41 in the longitudinal direction 4 of the inclined plane 1. In the example of FIG. 4B, the feeder 42 is arranged to rotate partly around the same shaft 43, around which the collector 41 can also be rotated. As in the collector 41, the feeder 42 of FIG. 4B comprises an arm, to the end of which a roller 48 is fitted rotatably. In an operation that is the reverse of that of the collector 41, the arm of the feeder 42 is arranged in such a way that, when the feeder 42 is rotated in the first direction, the arm sinks to the release position on or below the level of the plane 1, whereby the roll 22 can move over the feeder 42, and, when the feeder 42 is rotated in the second direction, the arm rises above the plane 1 to the hold position, preventing the movement of the roll 22. Like the collector 41, the feeder 42 comprises an operating arm and a hydraulic cylinder connected to it to rotate the feeder 42. Here too, the separate operating arm 45 can, of course, be replaced with another arrangement. FIG. 5 shows a top view of the sorting deck of FIG. 4A. FIG. 5 shows the inclined plane 1 and stops 2 in the release and hold positions. The figure also shows the upper-end conveyor 9 and the lower-end conveyor 10, as well as the longitudinal direction 4 between them. The figure also shows transfer devices 12. In the embodiment of FIG. 5, the stops 2 form in fact three adjacent lines of stops, in such a way that in the central line there is a closer spacing of a total of eight stops while in the left-hand and right-hand lines there are three stops in each, set at a greater distance apart. There are three rows of stops 2 in the sorting deck of FIG. 5.

In connection with both the collector 41 and the feeder 42, the hydraulic cylinders can naturally be replaced with some other suitable operating device, for example, with a pneumatically or electrically driven operating device. One example is the use of an electric motor to move the collector 41 and/or the feeder 42.

The distance between the consecutive stops 2 in the longitudinal direction 4 is typically greater than the diameter of the paper or board rolls being handled. Thus the distance is great enough for at least one of the paper or board rolls being handled to be located between consecutive stops 2. On the other hand, the distance between the collector 41 and the feeder 42 contained in the stop 2 is less than the diameter of the paper or board rolls typically being handled, so that normally one stop 2 at a time can be in direct contact with only one paper or board roll. The distance between the consecutive stops 2 is usually greater than 1.5 meters and generally at least 2 meters. The distance between the collector 41 and the feeder 42, on the other hand, is usually less than 1.5 meters.

FIG. 5 shows a top view of the sorting deck of FIG. 4A. FIG. 5 shows the inclined plane 1 and stops 2 in the release and hold positions. The figure also shows the upper-end conveyor 9 and the lower-end conveyor 10, as well as the longitudinal direction 4 between them. The figure also shows transfer devices 12. In the embodiment of FIG. 5, the stops 2 form in fact three adjacent lines of stops, in such a way that in the central line there is a closer spacing of a total of eight stops while in the left-hand and right-hand lines there are three stops in each, set at a greater distance apart. There are three rows of stops 2 in the sorting deck of FIG. 5.

In the operating situation shown by FIG. 5, narrow rolls 22 have been received on the three parallel lines of the sorting deck. The narrow rolls of the example are so light that they can be allowed to be supported on each other on the sorting deck and the feed of the rolls 22 forwards to the lower-end conveyor 10 can be controlled with the aid of the lowest row of stops. However, the rolling of the rolls 22 coming to the lines from the upper-end conveyor 9 can be slowed with the rows of the uppermost stops, which is why, in the operating situation of the figure, the upper stops are also shown as having being moved to the hold position.

FIG. 6 shows the sorting deck of FIG. 5 in a second operating situation. In the operating situation of FIG. 6, the rolls 23 being handled on the sorting deck are of medium width, and are wider than the lateral interval of the stops 2, but not, however, so heavy that they need to be supported individually, each on its own stop. In the operating situation of the figure, the central line of stops is moved entirely to the release position and the transfer of the medium-width rolls from the sorting deck to the conveyor 10 is controlled with the aid of the outer lowest row of stops. In addition, in the case shown in connection with FIG. 5, the aid of the upper stops 2 is used to prevent the speed of the rolls 23 rolling from the upper-end conveyor 9 to the line from increasing excessively.

FIG. 7 shows the sorting deck of FIG. 5 in a third operating situation. In the operating situation of FIG. 7, wide rolls 21 are being handled on the sorting deck, and are so heavy that there is reason to hold each roll individually on its own stop 2 and release them to roll for a longitudinal distance of only one stop at a time. The rolls 21 are controlled with the aid of the stops 2 of the central line, the stops of the outer lines being moved entirely to the release position. The concept 'entirely to the release position' refers in this case to the fact that, in the case of a dual-acting stop, both the collector 41 and the feeder 42 are in the release position.

In the embodiments described above, the control of the sorting deck can be implemented with the aid of a suitable controller device 8, with the aid of which the stops 2 are moved in such a manner that wide rolls 21 can be rolled along the sorting deck, and that when they roll they extend over two or more adjacent stops 2, and optionally two or more parallel lines of narrow rolls 22, the width of which corresponds to about half or a smaller fraction of the width of the said wide rolls 21, can be rolled over these same adjacent stops 2. In the examples of the figures, the width of the narrow rolls is about one third or slightly less than one third of the width of the wide rolls. These widths can of course vary freely within the limits set by the width of the sorting deck and the practical minimum width of the roll. With suitable control, the sorting deck can handle all of those widths.

The division of the width of the rolls, described above, into fractions of approximately the same size and multiples of them permits, however, a highly efficient use of space and a high degree of utilization of the sorting deck, which are important if the ramp is used as a temporary roll store. Thus a wide roll can also travel over more than three adjacent stops. In the following, however, the control is described with the aid of precisely such an embodiment that is very important in practice, in which the width of the narrow rolls is about one third of the width of the wide rolls. In this case, the width of the narrow rolls is, for example, less than 1400 mm, the width of the medium-width rolls is, for example, 1400-2500 mm, and the width of the wide rolls is more than 2500 mm, for example, 2500-1850 mm. In a second exemplary division, the width of the narrow rolls is less than 1400 mm, the width of the medium-width rolls is, for example, 1400-2250 mm, and the width of the wide rolls is more than 2250 mm, for example, 2250-4850 mm.

The sorting decks of FIGS. 1-3 and 5-7 comprise stops 2 located consecutively in three parallel lines in the longitudinal direction 4, i.e. in a center line, a left-hand line, and a right-hand line. However, the embodiments have the difference that, in the sorting decks of FIGS. 1-3, the possible center lines are all three of the lines in the center. Thus the left-hand line is always the line nearest the left-hand side of the selected center line and the right-hand line is always the line nearest the right-hand side of the selected center line. In this connection, there is as such practically no significance in the examination of the left and right directions, as the left-hand and right-hand lines are both controlled in the same way.

In the situation described above, the controller device 8 can be programmed in such a way that when handling wide rolls 21, the controller device 8 moves the stops 2 of the left-hand and right-hand lines to the release position (entirely to the release position, if the stop is dual-acting, as in FIG. 4B) and moves the stops 2 of the center line between the hold and release positions, in order to hold the wide rolls 21 in turn in place and in turn to release them to roll along the plane 1, in which case the rolls will roll in a single line over the stops 2 of the center line, the left-hand line, and the right-hand line, when handling medium-width rolls 23, the controller device 8 moves the stops 2 of the center line to the release position and the stops 2 of the left-hand and right-hand lines between the hold and release positions, in order to hold the medium-width rolls 23 in place and to release them to roll in two parallel lines along the plane 1, and when handling narrow rolls 22, the controller device 8 moves the stops 2 of each line between the hold and release positions, in order to hold the narrow rolls 22 in place and to release them to roll in three parallel lines along the plane 1.

If, in the example described above, dual-acting stops are used, the release of the medium-width and narrow rolls can be performed in such a way that the feeder is moved to the hold position at the same time as the collector is moved to the release position. In that case the rolls will be allowed to proceed over the stop one at a time.

Correspondingly, it is also possible to implement a method for controlling the sorting deck, in which, when handling wide rolls 21:

the stops 2 of the adjacent, i.e. left-hand and right-hand lines are moved to the release position, the wide rolls 21 are brought to the ramp positioned in such a way that the center line of the roll is essentially aligned with the center line 3 of stops, and the stops 2 of the center line are moved between the hold and release positions, in such a way that the wide rolls 21 roll one at a time from stop to stop, down to the lower edge 7 of the sorting deck.

Further, a method can be implemented, in which, when handling narrow rolls 22:

a suitable line 3 is selected for each roll 22, the rolls 22 are brought one at a time to the ramp positioned in the longitudinal direction in such a way that the roll coincides with the selected line, the rolls 22 are allowed to roll towards the lower edge of the sorting deck, and the lowest adjacent stops 2 are moved between the hold and release positions, in such a way that the narrow rolls are transferred one at a time off the sorting deck.

In addition, in the method, the rolling of the rolls 22 can be slowed with the aid of the stops, before the rolls meet the previous roll or the lowest stop.

In the operating situations described above, rolls of essentially the same width are always guided to one line. However, this is in no way essential; instead if desired, routes independent of these lines along the sorting deck can be selected for the rolls. Thus, with the aid of the invention, it is indeed possible to implement a method for moving paper and board rolls along a sorting deck, in which method rolls and the width data of each roll are received, longitudinal routes on the sorting deck are selected for the rolls, exploiting the width data, the rolls are brought to the selected routes, and the stops (2) are moved between the hold and release positions, in such a way that the rolls are moved along the sorting deck according to the selected routes.

The width data of the rolls can be received, for example, directly from the equipment preceding the sorting deck in the production line, from a separate measuring device, or from a marking located on the roll, such as a memory chip, barcode, or RFID sticker. The sorting deck can also be equipped with a measuring device, which can be used to determine the width of the roll being received.

When receiving narrower and wider rolls, these can be guided optionally either along the same longitudinal-direction routes, or, for example, along parallel routes, as in the examples described above. The narrower rolls can also be moved in parallel with a wider roll over essentially the same route. If it is desired to make the use of space in the sorting deck efficient, so that the greatest possible number of rolls of different width being received will fit onto the ramp, the routes of the rolls are optimized in such a way as to minimize the empty space remaining between the rolls.

Figure 8:
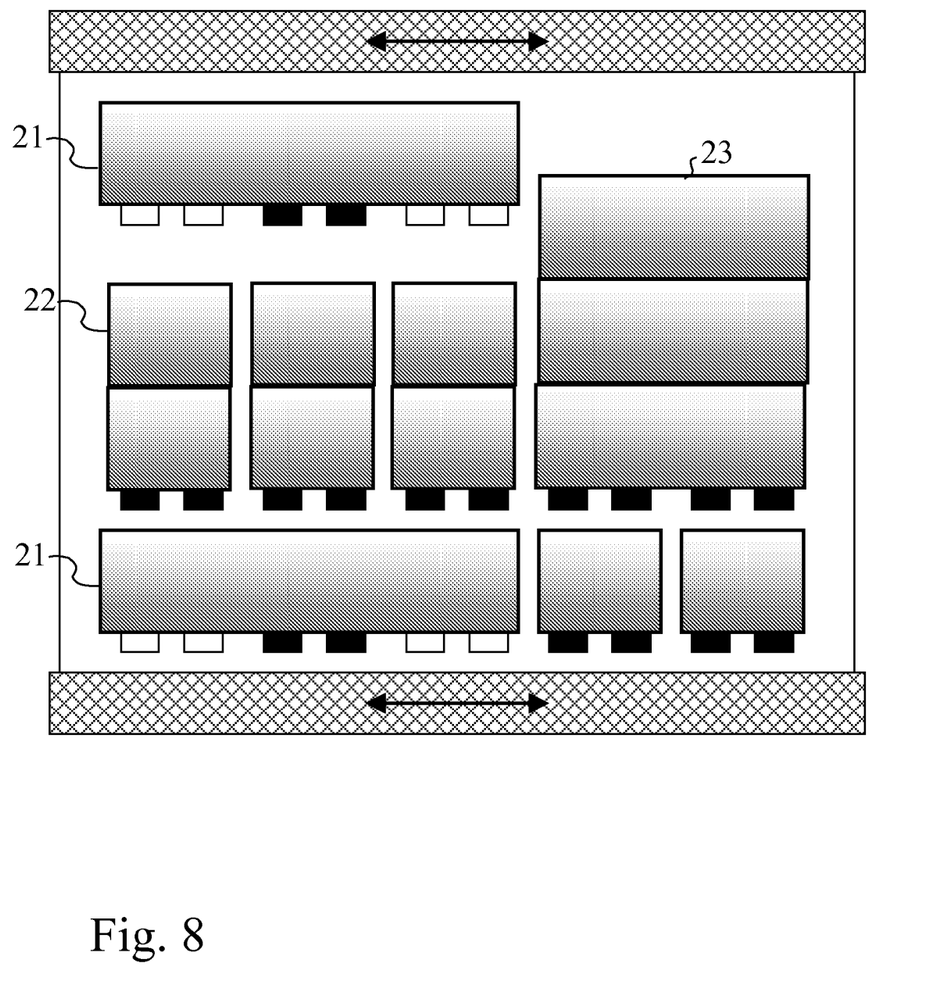
FIG. 8 shows the sorting deck of FIG. 1, in a third possible operating situation.

FIG. 8 shows one such operating situation, in which rolls 21, 22, 23 of different widths have been guided onto the sorting deck according to FIG. 1, to consecutive and parallel routes.

The aforementioned embodiments can be modified in several different ways, for example, so that some of the stops 2 are replaced by retarders, which are designed to slow the rolling of the roll, but not, however, to stop it. The stops to be replaced can be the stops used in the embodiments described above for slowing the rolling of the narrow and medium-width rolls, i.e. in practice all the other stops in the outermost lines of stops on the sorting deck, except the lowest stops. The retarder can be an operating device with its construction like that of the collector 41 shown in FIG. 4B, for example, the sinking of which to the release position is slowed when the rolling roll meets the retarder. The slowing can be implemented, for example, with the aid of a hydraulic cylinder, or a pneumatically or electrically operated operating device. In a quite similar manner the stops described in connection with the embodiments of FIGS. 1-7 can be used in a retarder mode, in which case the stop moves from the hold position to the release position in response to the load caused by the rolling roll and at the same time slows the speed of the roll.

The plane 1 also need not be inclined; instead the plane 1 can be essentially horizontal. In that case, the kinetic energy required to move the rolls is transmitted to the rolls with the aid of an operating device, such as a pusher. If desired, the operating device can be integrated in the stop solution, or separate operating devices can be used.

The rolls can also be transported along the plane 1 using bases, such as cradles, in which case the rolls will not roll along the plane 1. The base can travel along the inclined plane by gravity, or the base or roll on the base can be acted on by an operating device, in order to transport the roll along the plane.

The sorting deck can also be designed in such a way that the rolls are fed to the ramp and guided off the ramp from the same edge of the ramp. In that case, the examples described above can be modified, for example, in such a way that the plane 1 is set to an essentially horizontal position and the ramp is equipped with operating devices, which provide the rolls with the necessary kinetic energy. If it is wished to fill and empty such a ramp from one edge, one of the conveyors 9 and 10 can be omitted. Of course the ramp can also be filled and emptied from both edges, in which case both of the conveyors 9 and 10 can be used to both bring rolls to the ramp and to remove rolls from the ramp.

On the basis of the examples described above, it is obvious that within the scope of the invention numerous solutions differing from the embodiments described above can be implemented. Thus the invention is not intended to be restricted to apply to only the examples described above, but instead the patent protection should be examined to the full extent of the accompanying Claims.

The invention claimed is:

1. A sorting deck for paper, board, or pulp rolls comprising:
a plane defining a longitudinal direction for transporting the rolls, the plane defining a transverse or lateral direction perpendicular to the longitudinal direction;
a plurality of independently controllable stops arranged to hold the rolls in place on the plane;
wherein the stops are positioned to form at least one line of at least two stops, in which the stops are placed consecutively in the longitudinal direction of the plane, and wherein the stops form at least one row of at least two stops, in which the stops are positioned adjacently to each other along the transverse or lateral direction of the plane;
wherein each stop of the at least one row of stops comprises a collector and a feeder, which are spaced from each other in the longitudinal direction of the plane, and wherein the collector is arranged to move freely between a position which holds a roll and a position which releases a roll, and the feeder is arranged to move freely between a position which holds a roll and a position which releases a roll, wherein the collector and the feeder are arranged so that a plurality of rolls traveling over each stop of the at least one row of stops can be prevented from passing over the stop, freely permitted to pass over the stop, or allowed to pass over the stop one roll at a time.

2. The sorting deck of claim 1 wherein each stop of the at least one line of stops comprises a collector and a feeder, which are spaced from each other in the longitudinal direction of the plane and wherein the collector is arranged to move freely between a position which holds a roll and a position which releases a roll, and the feeder is arranged to move freely between a position which holds a roll and a position which releases a roll; and
wherein the collector and the feeder are arranged so that a plurality of rolls traveling over each stop of the at least one line of stops can be: prevented from passing over the stop, freely permitted to pass over the stop, or allowed to pass over the stop one roll at a time.

3. The sorting deck of claim 1 wherein the sorting deck comprises at least three rows of stops located in the longitudinal direction of the plane spaced from each other, wherein each stop of the at least three rows of stops comprises a collector and a feeder, which are spaced from each other in the longitudinal direction of the plane and
wherein the collector is arranged to move freely between a position which holds a roll and a position which releases a roll, and the feeder is arranged to move freely between a position which holds a roll and a position which releases a roll; and
wherein the collector and the feeder are arranged so that a plurality of rolls traveling over each stop of the line of stops can be prevented from passing over the stop, freely permitted to pass over the stop, or allowed to pass over the stop one roll at a time.

4. The sorting deck of claim 1 wherein the plane is an inclined plane falling in the longitudinal direction, and defining a lower edge of the deck, and wherein at least one row of stops is located close to the lower edge of the sorting deck.

5. The sorting deck of claim 4 wherein the at least one row of stops located close to the lower edge of the sorting deck comprises at least two stops that are arranged with independent control.

6. The sorting deck of claim 4 wherein the at least one row of stops located close to the lower edge of the sorting deck comprises at least three stops that are arranged with independent control.

7. The sorting deck of claim 5 wherein each stop of the row of stops located close to the lower edge of the sorting deck comprises a collector and a feeder, which are spaced from each other in the longitudinal direction of the plane, and wherein the collector is arranged to move freely between a position which holds a roll and a position which releases a roll, and the feeder is arranged to move freely between a position which holds a roll and a position which releases a roll, wherein the collector and the feeder are arranged so that a plurality of rolls traveling over each stop of the row of stops located close to the lower edge of the sorting deck can be prevented from passing over the stop, freely permitted to pass over the stop, or allowed to pass over the stop one roll at a time.

8. The sorting deck of claim 1, wherein at least one of the stops is arranged to function as a retarder for slowing the speed of rolls rolling over the plane.

9. The sorting deck of claim 1 wherein the stops are in a matrix over the plane.

10. The sorting deck of claim 9 further comprising:
a controller device connected in controlling relation to the stops in such a way that wide rolls of a first width, which extend over two or more adjacent stops when they move over the stops can be transported over the sorting deck, and short rolls less then or equal to about half the first width of the wide rolls can be transported over these same adjacent stops in at least two parallel lines.

11. The sorting deck of claim 1 wherein stops are located consecutively in the longitudinal direction in at least three parallel lines including a central line, a left-hand line, and a right-hand line.

12. The sorting deck of claim 11 wherein the deck is between a first conveyor and a second conveyor, and wherein each stop is comprised of a first mechanism mounted to the deck to hold a roll, or to allow a roll to pass over the deck, and a second mechanism mounted to the deck and actuatable independently of the first mechanism to hold a roll, or to allow a roll to pass over the deck and spaced in the lateral direction from the first mechanism;
and further comprising:
a controller device in controlling communication with the first mechanism and the second mechanism of each stop so that each first mechanism and each second mechanism of the stops of the deck may be independently commanded to hold a roll or to allow a roll to pass over the deck from the upper conveyor to the lower conveyor, or to be held intermittently at one or more of said stops, the arrangement of the controller device and the stops allowing simultaneous handling of rolls of different axial length simultaneously.

13. The sorting deck of claim 1 wherein each stop, of the plurality of controllable stops, has a collector and a feeder, and wherein the collector and the feeder are mounted for movement to or below the level of the plane such that a roll can travel freely over the stop.

14. A Method for handling paper, board, or pulp rolls comprising the steps of:
receiving rolls of different widths on to a sorting deck, which defines a plane with a longitudinal direction along which the rolls are transported, and a transverse or lateral direction perpendicular to the longitudinal direction;
wherein the sorting deck has a plurality of stops each stop being comprised of a collector mounted to the deck to hold a roll, or to allow a roll to pass over the collector and along the deck, and a feeder mounted to the deck and actuatable independently of the collector to hold a roll, or to allow a roll to pass over the feeder and along the deck and the feeder spaced in the downward sloping direction from the collector;
transporting a plurality of rolls of different width by moving each roll along a path in the longitudinal direction on the deck, so that each roll travels over a subset of the plurality of stops;
moving the collectors and feeders of the stops between hold and release positions, in order to transport the rolls of different widths over the plane of the sorting deck;
wherein in the path of each roll, only a single stop engages the roll at a single time, either because the width of the roll covers only a single stop, or where multiple stops are covered by the roll simultaneously all but one stop is configured to allow the roll to pass over the collector and feeder of the stop and along the deck;
wherein the motion of each roll is controlled by the single stop as each roll is prevented from passing over the stop, freely permitted to pass over the stop, or allowed to pass over the stop one roll at a time;
thus transporting rolls of different widths over the same stops.

15. The method of claim 14 wherein the sorting deck has stops located consecutively in the longitudinal direction in at least three parallel lines, including a central line, a left-hand line, and a right-hand line further comprising the steps of
moving first rolls spanning said three lines by moving the collectors and feeders of the stops of the left-hand and right-hand lines to the release position and moving the collectors and feeders of the stops of the center line between the hold and release positions to hold the wide rolls in place and to release them to travel over the plane so that the rolls travel in a single line over the stops of the center line, the left-hand line, and the right-hand line, which have been moved to the release position;
moving two sets of second rolls in parallel over the three parallel lines of stops by moving the collectors and feeders of the stops of the center line to the release position and moving the collectors and feeders of the stops of the left-hand and right-hand lines between the hold and release positions to hold the two sets of rolls in place and to release them to travel over the plane in two parallel lines; and
moving three sets of third rolls in parallel over the three parallel lines of stops and moving the collectors and feeders of the stops of the three lines between the hold and release positions to hold the three sets of rolls in place and to release them to travel over the plane in three parallel lines.

16. The method of claim 15 wherein in creating the path the collector and feeder of at least one stop is moved simultaneously to allow a roll to pass over the collector and the feeder.

17. The method of claim 14, wherein at least one stop is used in a retarder mode in which the stop moves from the hold position to the release position in response to the load caused by a rolling roll and so slows the speed of the rolling roll.

18. The method of claim 14, wherein at least one wider roll, as well as at least one narrower roll, the width of which is less than half of the width of the said wider roll, are transported over the same stops, and the wider roll travels over at least two stops adjacent in the transverse or lateral direction.

19. A sorting deck for paper, board, or pulp rolls comprising:
an upper conveyor;
a lower conveyor;
the sorting deck extending along an incline between the upper conveyor and the lower conveyor, the sorting deck defining an inclined plane which defines a longitudinal direction along the incline of the plane and defining a transverse or lateral direction perpendicular to the longitudinal direction, the sorting deck arranged as a ramp to allow the rolls to move along the longitudinal direction between the upper conveyor and the lower conveyor;
a plurality of independently controllable stops arranged to hold the rolls in place on the sorting deck when the stops are in a first position and to release the rolls to travel over the plane in the longitudinal direction when the stops are in a second position;

wherein the stops are positioned to form at least one line of at least two stops, in which the stops are placed consecutively in the longitudinal direction of the plane, and wherein the stops form at least one row of at least two stops, in which the stops are positioned adjacently to each other along the transverse or lateral direction of the plane; and wherein each stop comprises a collector and a feeder, which are located at a distance from each other in the longitudinal direction of the plane, and wherein both the collector and the feeder are mounted to the deck for movement between a hold position extending above the deck and a release at or below the deck, and wherein the collector and the feeder are mounted for independent movement with respect to each other, so that the travel of the rolls over the stop can be: prevented when one or both of the feeder and collector are extended above the deck: freely permitted when both the feeder and collector are positioned at or below the deck: permitted one roll at a time, by the position of the feeder and the position of the collector alternating with each other between being positioned above the deck, and being positioned at or below the deck.

20. The sorting deck of claim 19 wherein stops are located consecutively in the longitudinal direction in at least three parallel lines including a central line, a left-hand line, and a right-hand line, and wherein the number of stops in the central line is greater than in either the left-hand line or right-hand line.

21. The sorting deck of claim 19 wherein the sorting deck comprises a multiplicity of stops arranged in an array, and further comprising a plurality of rolls of a first length, a plurality of rolls of a second length are positioned on the sorting deck by said stops.

22. The sorting deck of claim 21 wherein the second length is less than one half the first length.

* * * * *